Aug. 2, 1927.
J. EILERS
1,637,412
SAFETY DEVICE FOR APPARATUS FOR FORCED LUBRICATION IN COMBUSTION ENGINES
Filed Feb. 3, 1927
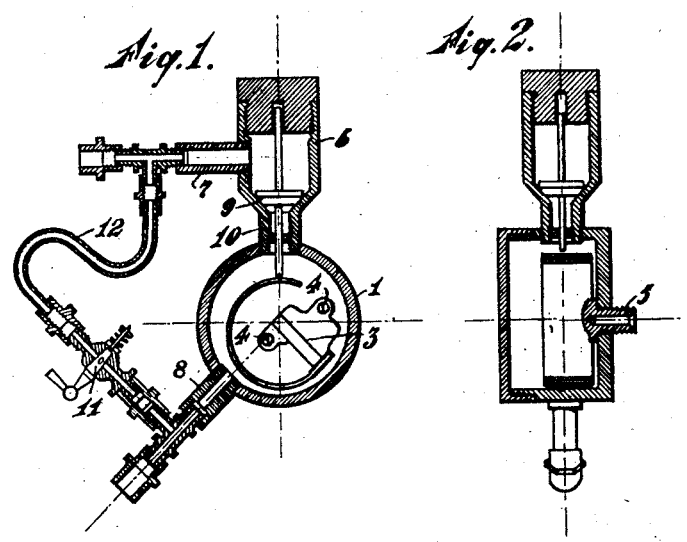
INVENTOR
Jan Eilers
by Langner, Parry, Card & Langner
Att'ys.

Patented Aug. 2, 1927.

1,637,412

UNITED STATES PATENT OFFICE.

JAN EILERS, OF MEESTER CORNELIS, JAVA, DUTCH EAST INDIES, ASSIGNOR OF ONE-HALF TO TJOEN SIANG IE, OF MEESTER CORNELIS, JAVA, DUTCH EAST INDIES.

SAFETY DEVICE FOR APPARATUS FOR FORCED LUBRICATION IN COMBUSTION ENGINES.

Application filed February 3, 1927, Serial No. 165,736, and in the Netherlands September 18, 1924.

The invention relates to a safety device for apparatus for forced lubrication in combustion engines, comprising a movable member arranged in the pressure oil conduit, which member may cooperate with a closing device in the fuel conduit, in such a way that if the oil does not circulate any more, and therefore has no more the required pressure, the fuel supply conduit is closed and the engine is stopped.

The device according to the invention is distinguished from the known devices of this kind by the fact that the valve of the closing device is actuated by a hollow spiral shaped tube connected with the lubricant conduit and the free end of which rests against the valve stem.

In this way an important simplification is obtained, an exact functionating at the same time being secured.

In the drawing the invention is nearer explained as follows:

Fig. 1 shows a section of an embodiment of the invention;

Fig. 2 shows a section in a plane vertically to that according to Fig. 1.

In a cylinder shaped casing 1 a spiral shaped flat tube 2 of resilient material is arranged. This tube is fixed with its one end to a piece 3 which by the aid of two screws 4 is attached to one of the side walls of the casing 1. The interior of the tube is connected with a channel in the piece 3 which in its turn ends in a tubular part 5 (Fig. 2) of the piece 3, extending through an opening in the wall of the casing 1. In the embodiment according to the drawing this tubular part is provided with screw thread by which it is screwed in the opening in the wall of the casing. To this tubular part 5 the lubricating conduit is connected so that the pressure in this conduit is continued in the spiral tube 2.

At the upper side the casing 1 is connected to a valve case 6, the interior of which is connected by a conduit 7 with the fuel supply, while at the lower side of the casing 1 the conduit 8 to the engine is arranged. The valve 9 in the valve case which may close the connection between the vale case 6 and the casing 1 is provided with a stem 10 which touches the free end of the spiral tube 2 as soon as the latter is tensioned owing to the inner oil pressure. If no pressure avails in the spiral tube the valve stem does not rest on it, and the valve is closed and the fuel stream to the engine is interrupted. If therefore by a derangement in the oil circulation the pressure in the oil conduit and consequently also in the spiral tube ceases the valve 9 will be closed and by the interruption of the fuel supply the motor will be stopped.

By means of a connection 12 provided with a cock 11 between conduits 7 and 8 the safety device may be put out of circuit.

The safety device may be applied to every kind of apparatus for force lubricating and in all kinds of combustion engines.

I claim:

1. A safety device for internal combustion engines employing pressure lubrication, comprising an oil pressure conduit, a fuel supply conduit, a valve in the fuel supply conduit controlling the same, and valve operating means including a Bourdon tube within said fuel supply conduit in communication with the oil pressure conduit.

2. In combination, a safety device for internal combustion engines employing pressure lubrication, comprising an oil pressure conduit, a fuel supply conduit, a valve in the fuel supply conduit controlling the same, valve operating means including a Bourdon tube within said fuel supply conduit in communication with the oil pressure conduit, and a valve controlled normally closed by-pass for said fuel supply conduit, around said safety device.

In testimony whereof I affix my signature.

J. EILERS.